United States Patent [19]
Marmann

[11] Patent Number: 5,106,061
[45] Date of Patent: Apr. 21, 1992

[54] COMPACT LANCE

[75] Inventor: Horst Marmann, Ratingen, Fed. Rep. of Germany

[73] Assignee: BEDA Oxygentechnik Armaturen GmbH, Ratingen, Fed. Rep. of Germany

[21] Appl. No.: 662,613

[22] Filed: Feb. 28, 1991

Related U.S. Application Data

[62] Division of Ser. No. 429,216, Oct. 30, 1989, Pat. No. 5,002,263.

[30] Foreign Application Priority Data

Dec. 2, 1988 [EP] European Pat. Off. ........ 88120124.8

[51] Int. Cl.⁵ .................................................. C21C 5/32
[52] U.S. Cl. ...................................... 266/225; 266/270
[58] Field of Search .................... 266/225, 226, 270

[56] References Cited

U.S. PATENT DOCUMENTS

| | | | |
|---|---|---|---|
| 3,827,632 | 8/1974 | Rymarchyk et al. | 266/225 |
| 4,317,561 | 3/1982 | Schulz | 266/226 |
| 4,732,370 | 3/1988 | Berry et al. | 266/225 |

FOREIGN PATENT DOCUMENTS

| | | |
|---|---|---|
| 1979917 | 10/1964 | Fed. Rep. of Germany . |
| 2327595 | 10/1974 | Fed. Rep. of Germany . |
| 7508317 | 7/1975 | Fed. Rep. of Germany . |

*Primary Examiner*—S. Kastler
*Attorney, Agent, or Firm*—Nils H. Ljungman & Associates

[57] ABSTRACT

A compact lance, for tuyeres. The lance provides a compact and secure holder by providing a bushing between a collet chuck and a gasket sleeve. This bushing can move axially inside an inner hole of the handle, but cannot rotate in the hole. The bushing acts on the collet chuck to keep it immobile. Twisting of the tuyere is prevented by a slot in the bushing, a radial hole in the handle and a locator screw. By turning the locator screw down to the outer jacket of the tuyere, there is a fastening of the tuyere inside the tuyere holder. There is also a gas and slag holdback valve in the handle and a streamlined quick-action stop valve. A rapid closing valve is also provided and operated by means of an ergonomically designed operating lever.

20 Claims, 3 Drawing Sheets

COMPACT LANCE

This is a division of application Ser. No. 07/429,216, filed on Oct. 30, 1989, now U.S. Pat. No. 5,002,263.

BACKGROUND OF THE INVENTION

1. Field of the Invention

This invention relates to a compact lance for the introduction of oxygen during a combustion process. The lance has a closer and a collet chuck, which allow a tuyere to be introduced into the handle in a manner which prevents twisting. An axial gasket is positioned to be placed in contact with the tuyere and is partly enclosed by a gasket sleeve. The gasket is compressible by the collet chuck between a shoulder, positioned adjacent an inner hole, and a sleeve which encloses the end of the tuyere.

2. Description of the Prior Art

Compact lances are used during oxidation processes, such as steel making processes, to connect partly consumable oxygen lances, or tuyeres, with a handle to insure that the oxygen lances, or tuyeres, are securely mounted during handling. Tuyere holders are generally disclosed in German Utility Model No. 19 39 317 and German Patent No. 23 27 595. Tuyere holders of the prior art include a handle which has a housing with an inner hole having shoulder-type stops for supporting and acting as a bearing for various insertable devices. The tuyere is inserted into an inner. hole of the holder and into a closer and collet chuck. Once inserted into the holder in this manner, the tuyere is mounted in a sleeve, which has a slag holdback device. The slag holdback device may then be opened when the tuyere is mounted in the sleeve.

The holder comprises two exterior cover members which are connected to one another by cooperating screw-type threads. When the cover members are screwed together tight, the collet chuck becomes compressed so that it holds the inserted tuyere in place. Also, when the cover members are being screwed together, the collet chuck is moved toward the inserted end of the tuyere, thereby compressing a gasket, which is mounted in a gasket sleeve, against the tuyere. The gasket provides a gas-tight connection between the end of the tuyere and the end of the tuyere holder or handle.

Depending on the type of combustion process, either straight tuyeres or curved tuyeres are used. When using a curved tuyere, there is a danger that the collet chuck will rotate when the tuyere is rotated, thereby unintentionally loosening, and possibly disengaging, the tuyere from the handle. Even if the tuyere is only loosened, but not completely disengaged from the handle, it may be more difficult to reach the point where oxygen is to be applied with the curved end of the tube. German Utility Model No. 75 08 317 discloses a quick-action stop valve which can be activated by means of a control lever. However, even with this device, twisting of the collet chuck is not prevented.

OBJECT OF THE INVENTION

One object of this invention, therefore, is to create a compact lance which prevents twisting of the collect chuck and is designed in a safe, secure and easy to operate manner.

SUMMARY OF THE INVENTION

This object is accomplished by positioning a bushing between the collet chuck and gasket sleeve. The bushing is configured so that it can be moved axially, but not radially, or rotationally, in the inner hole of the handle.

As a result of this bushing, which is positioned in the handle, and because the bushing is locked or fixed in the radial direction so that it cannot rotate, it is possible to securely prevent an unintentional opening of the collet chuck when the tuyere is twisted since the collet chuck and the radially fixed bushing are connected together, preferably, by a weld. Therefore, even if the tuyere rotates, it will not loosen from the handle. Of course, it is also possible to prevent twisting of the tuyere altogether, because the tuyere may be fixed in a stationary manner in the handle. Protection against twisting is, therefore, provided which is integrated into the handle so that the entire unit can, advantageously, be kept short.

In one embodiment of the invention, the bushing has a slot and the handle has a radial hole. A locator screw is positioned through the hole and into the slot. The slot is configured to allow axial, but not radial, movement of the bushing. The mobility required to compress the gasket is, thereby, retained, while twisting in the radial direction is prevented. This configuration facilitates the retrofitting of existing tuyere handles through the addition of the above-described bushing and screw.

To prevent twisting of the collet chuck, when the tuyere twists, it is preferable to connect the bushing to the collet chuck by welding. Such a configuration is particularly for retrofittings while, for newly manufactured units, the collet chuck and bushing can be appropriate made into a single piece.

Because of the interposition of the bushing, it is advantageous for compact construction if the portion of the handle, where the collet chuck is positioned, has an external thread which corresponds to the internal thread of the closer. The closer is, thereby, moved along the longitudinal axis of the handle when the tuyere is tightened or fixed, since both have screw type threads which correspond to one another. Simultaneously, therefore, the pressure produced by the locking of the tuyere to the handle is exerted on the collet chuck also. That makes possible a completely closed housing, which is advantageous in terms of compactness and overall safety, since additional parts, such as threaded rods among others, are no longer necessary.

When the tuyere is inserted into the inner hole of the handle, damage to the gasket is prevented because the inside diameter of the bushing is designed to be the same as that of the adjacent gasket. The tuyere is, thus, guided straight into the bushing so that it can easily be introduced into the gasket. Appropriate adjustments can be made to the gasket and other components to guarantee insertion through the bushing.

Once the tuyere is centered through the bushing, it is easily introduced through the gasket and, simultaneously, precisely positioned in the handle since the sleeve holding the tuyere, preferably, has a shoulder against which the end of the tuyere is positioned. The remainder of the sleeve, which extends further into the inner hole, is designed as a tappet for the installation of a pressure loaded valve. The tuyere, thereby, slides automatically into the sleeve when inserted into the handle until it comes in contact with the shoulder so that, if the pressure-loaded valve is connected, the valve can be automatically positioned or pushed into place by an appropriate displacement of the sleeve. Also, an appropriately shaped shoulder can be advantageously used to facilitate the ejection, or return, of the sleeve when the tuyere is removed.

In one configuration of the invention, the return of the sleeve to its original position is, thereby, achieved because the shoulder of the sleeve is elastically supported in the inside hole. When the pressure on the sleeve is removed, e.g. by removal of the tuyere, the sleeve is automatically returned to its original position, and is positioned for a repeated insertion of the tuyere. Movement of the tuyere since longitudinal moving of the closer also moves the tuyere longitudinally.

The elastic configuration can be appropriately achieved by positioning, on the outside wall of the sleeve part, a coil spring, braced against a projection in the inner hole. This spring helps to provide a seal and is positioned in the sleeve inside the inner hole of the handle.

Preferably, the handle will have sufficient wall thickness for secure engagement of the locator, or set, screw, if the radial hole for the locator screw is positioned in the vicinity of a thicker portion of a housing of the handle. This thicker portion of the housing can, also, be used to limit the displacement of the closer, if such limited displacement should turn out to be necessary for the sleeve, e.g. for safety reasons. This thicker portion of the housing has the additional advantage that the tip of the locator screw can be designed as a pivot over an appropriate length to thereby achieve the longitudinal displacement capability of the bushing, but to prevent its radial rotation.

A secure fastening of the tuyere inside the handle can also be achieved by tapering the free end of the collet chuck so that it interacts with the rounded edges of a sleeve which has a radial extension. With this configuration, the closer is, preferably, in contact with the sleeve by means of an interposed ball bearing. The ball bearing makes certain that there is a uniform and secure transmission of the corresponding movement to the sleeve and to the collet chuck.

To improve ease of handling and to increase safety, a special configuration of a gas and slag holdback apparatus, or valve, is provided in the form of a cutoff valve, a sinter metal disc and a gas check valve, as well as an ergonomically shaped operating lever and a streamlined quick-action stop valve.

This invention is characterized by the fact that a very compact handle becomes available by integrating protection against twisting in an appropriate fashion, which also makes possible a simple and safe operation of the tuyere holder, even if curved or angled tuyeres are used. In addition to the compact construction, the invention also makes it possible for all the individual parts located inside the handle to be reduced to the minimum number necessary, so that a reduced inventory of spare parts can be maintained. Additionally, increased operating safety is, also, a result of the compact embodiment of the tuyere holder.

One aspect of the invention resides broadly in a compact lance which includes a handle defining a longitudinal axis, a chuck positioned within the handle, a gasket positioned within the handle and axially aligned with the chuck along the longitudinal axis, a bushing axially movable along the longitudinal axis and positioned between the chuck and the gasket, apparatus for axially moving the bushing into compressive contact with the gasket, and apparatus for substantially limiting relative rotation between the bushing an the handle.

BRIEF DESCRIPTION OF THE DRAWINGS

The following Description of a Preferred Embodiment may be better understood if taken in conjunction with the appended drawings in which.

DESCRIPTION OF THE PREFERRED EMBODIMENT

Figure 1:
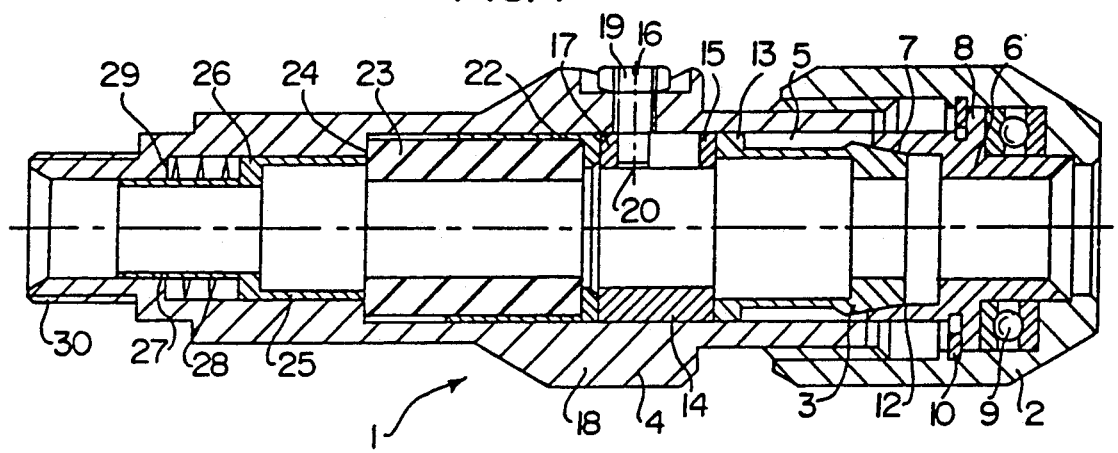
FIG. 1 is a sectional, side elevational view of a portion of a lance of the present invention.

Tuyere holder 1 has closer 2 which surrounds collet chuck 3. Both are guided in or on handle or holder 4, and collet chuck 3 is guided so that it can move individually inside inner hole 5 of holder 4.

Sleeve 6 is located in closer 2, and has edges 7 which correspond to taper, or pointed tip, 12 of collet chuck 3, and acts on collet chuck 3. Closer 2 acts directly on extension 8 of sleeve 6 by means of ball bearing 9, so that, as described below, by twisting closer 2, sleeve 6 is also moved. Circle clip 10 is provided to make certain that sleeve 6, during the release process, moves along with closer 2.

Figure 3:
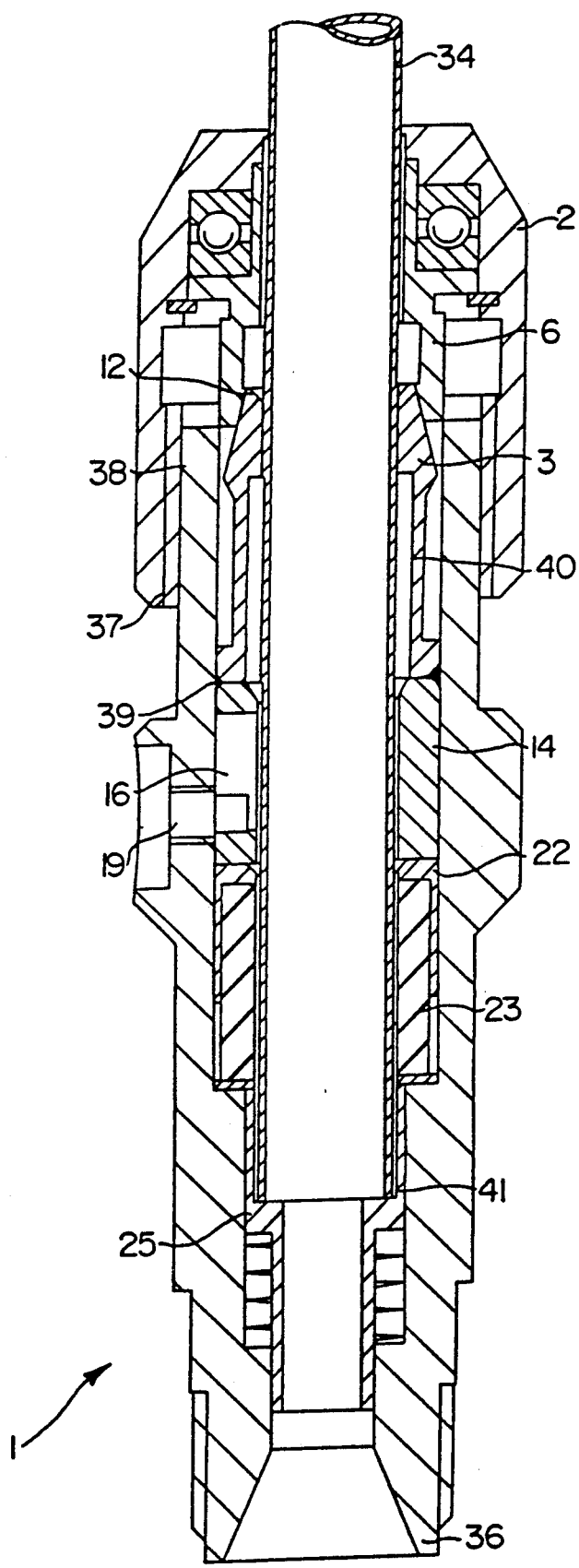
FIG. 3 is a sectional, side elevational view of the present invention along with an associated tuyere.

When closer 2 and holder 4 are relatively twisted, sleeve 6 is pushed onto pointed tip 12 of collet chuck 3 as shown in FIG. 3. Then, the entire collet chuck 3 is pushed in the longitudinal direction of inner hole 5, until the end of tuyere 34 is fixed, as will be explained below. The elastic action of collet chuck 3 is achieved by an appropriate configuration of taper tip 12 and the adjacent part, whereby collet chuck 3 has ring-shaped shoulder 13 positioned on one end.

Shoulder 13 is in contact with and, preferably, connected to bushing 14. This may be accomplished, preferably, by welding shoulder 13 to bushing 14. Shoulder 13, of collet chuck 3, is in contact with shoulder extension 15 of bushing 14. Bushing 14 can be displaced, together with collet chuck 3, in the longitudinal direction of handle 4, because bushing 14 has slot 16, into which locator screw 19 projects. Thus, axial movement is guaranteed, but radial movement or twisting is prevented.

Locator screw 19 is screwed into a corresponding radial hole 17 in handle 4, and extends with locator 20 right up against tuyere 34. Radial hole 17 is located in the vicinity of a thicker portion of housing 18 so that the required wall thickness is available to create a secure seat for locator screw 19.

Adjacent to bushing 14 is gasket sleeve 22, which partly surrounds gasket 23. When tuyere holder 1 is moved in the longitudinal direction of inner hole 5, gasket sleeve 22 is moved along with it.

Gasket 23 cannot expand or be moved in the longitudinal direction, therefore, it is compressed in the lower portion and provides a seal by contact against the wall of tuyere 34, as shown in FIG. 3. Gasket 23 is braced during compression between gasket sleeve 22 and projection 24 in the inner hole, so that it is forced to surround tuyere 34 in a sealed manner.

Gasket 23 and bushing 14, appropriately, have corresponding inside diameters, so that bushing 14, simultaneously, serves as a guide for the gasket. Adjacent to gasket 23 is additional sleeve 25, which has an expanded portion with shoulder 26 adapted to the outside diameter of tuyere 34, so that end 41 of tuyere 34 can be securely introduced.

On either side of shoulder 26, the lower portion of sleeve 27 has coil spring 28, to achieve a certain elastic support on projection 29. On the end of the handle 4, external thread 30 is positioned to connect handle 4 with the oxygen hose.

FIG. 1 shows that, because of the appropriate configuration of inner hole 5, all the individual parts of the end facing the tuyere can be inserted into the one-piece handle. Thus, significant simplification is achieved, along with a very compact construction.

Figure 2:
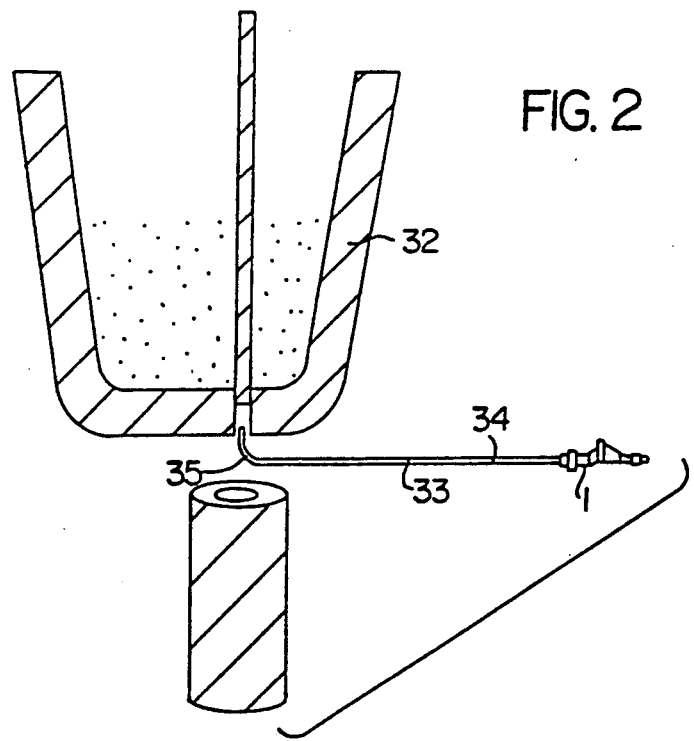
FIG. 2 is a sectional, side elevational view of a steel container in which is inserted a lance employing the present invention.

FIG. 2 shows steel container 32, into which oxygen lance 33 is to be introduced, from below. Tuyere 34 is fastened on the end in tuyere holder 1 or handle 4 and, in accordance with the illustrated configuration, a secure fastening is possible, even if tuyere 34 has curve 35.

Advantageously, with tuyere holder 1 designed in accordance with FIG. 3, a number of tuyeres of conventional cross-sections can be inserted. Also, even tuyeres with very small diameters can be securely fastened; tuyeres which would, otherwise, easily tend to twist.

FIG. 3 is an enlarged representation of the tuyere holder illustrated in FIG. 1. In this figure, tuyere 34 is inserted, but not yet fixed or locked, in place. This figure shows the very compact design of handle 4 in which closer 2 projects beyond collet chuck 3, with sidewall 40 and the uppermost piece of handle 4. The displacement, or movement of closer 2 is done by twisting handle 4, which has external thread 37, relative to closer 2, which has internal thread 38. Both threads 37 and 38 are screw type threads and correspond to one another. When closer 2 is twisted relative to handle 4, it is, thereby, moved toward lower end 36 of handle 4. This movement of closer 2 and handle 4, in relation to one another, also causes a movement of sleeve 6 inside closer 2 and, via the latter, causes movement of collet chuck 3 toward lower end 36.

Adjacent to collet chuck 3 is bushing 14. Bushing 14 moves back and forth in both directions of the longitudinal axis of handle 4 because it is connected together with collet chuck 3. Bushing 14, in turn, applies force to gasket sleeve 22 and gasket 24. As a result of the corresponding compression, gasket 24 is now in contact with the external wall of tuyere 34. The entire tuyere 34 is displaced so that sleeve 25, in inner hole 5, which holds tuyere end 41 also moves in the axial direction. Such movement is possible because of slot 16 inside inner hole 5.

When releasing tuyere holder 1, closer 2 is twisted in the reverse direction, causing collet chuck 3 to move along with closer 2, due to mutual friction between them, so that they move as a unit. Moreover, sleeve 25 is automatically retracted by coil spring 28 so that the shoulder, including the entire sleeve 25, is pushed toward the upper end of tuyere holder 1. The other parts, including collet chuck 3, can thereby be moved back in inner hole 5, or they can be pushed back automatically since sleeve 6, with its sharp edges 7, moves together with closer 2.

Bushing 14 and collet chuck 3 are connected to one another by means of weld 39, so that they both execute the same linear movement but cannot be moved radially.

Figure 4:
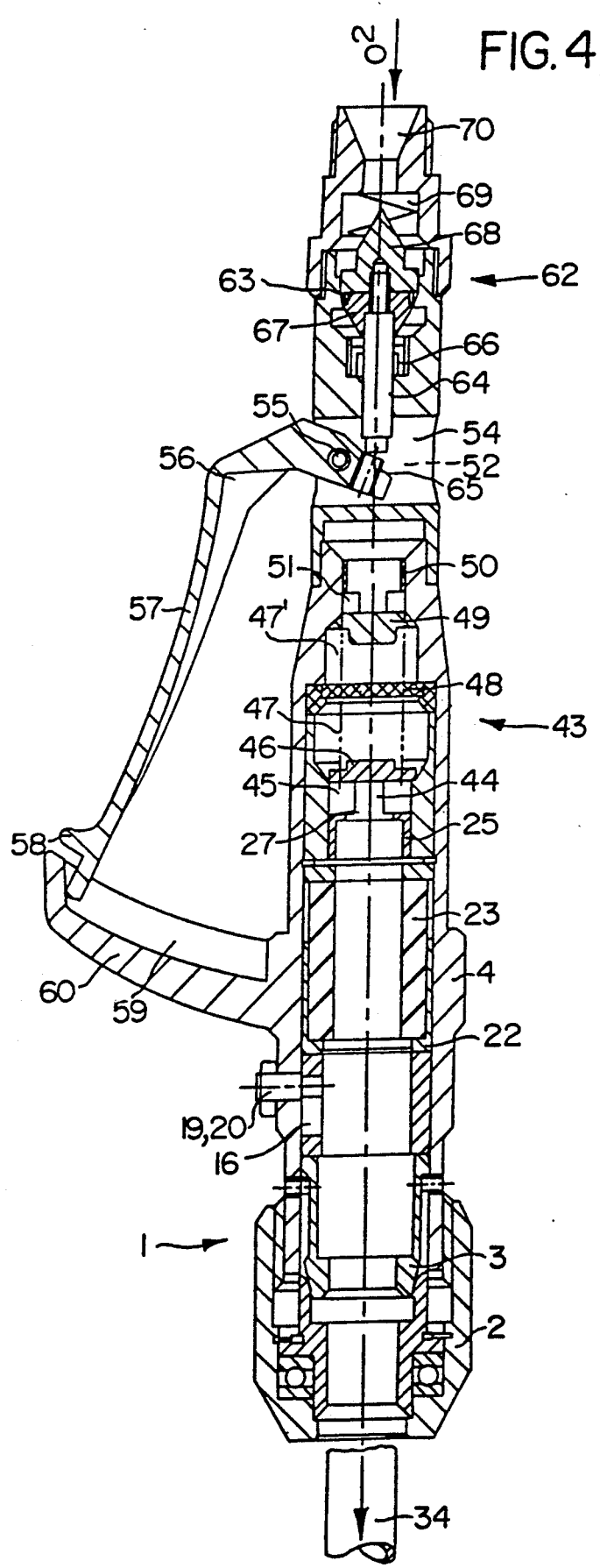
FIG. 4 is a sectional, side elevational view of a lance employing the present invention.

FIG. 4 shows an overall view of a compact lance with the entire handle 4 being shown in cross-section. Tuyere 34 is shown schematically. Tuyere 34 can be inserted from above into closer 2 and through collet chuck 3. By tightening closer 2, tuyere 34 is then fastened in tuyere holder 1 as described above.

Gas and slag holdback valve 43 is inside handle 4. By moving sleeve 25, and thus sleeve part 27, sleeve end 44 which has openings 45 for gas passage, acts to allow the gas to reach cutoff valve, or shutoff valve disc, 46. Sleeve 25 and cutoff valve 46, preferably, form a single unit. Cutoff valve 46 is biased by means of spring 47, so that a seal is still present, even when no tuyere is inserted.

If tuyere 34 is inserted, and, thus, cutoff valve 46 is raised from its seat, then gas can flow through handle 4, if the required pressure is present to open gas check valve 49. Sinter metal disc 48 is gas permeable and makes certain that, in the case of a slag penetration or similar undesirable action by such material on sinter metal disc 48, the slag or material cannot penetrate farther into handle 4. Sinter metal disc 48 is, accordingly, fixed or braced between springs 47 and 47'. In guide 50, openings 51 are provided to guarantee passage of the gas.

Before the gas can pass gas check valve 49, and thus the gas and slag holdback valve 43, it must first flow through quick-action stop valve 62. Quick-action stop valve 62 is opened by a control lever which can pivot in guide slot 54 around the axis of rotation 55. The gas, after passing quick-action stop valve 62, can then flow through overflow passages 52 into the remaining area of handle 4, so that it can finally flow through tuyere 34.

Grip 57, of control lever 56 is, ergonomically designed to guarantee a secure hold by an operator. When control lever 56 is pivoted, the operator's hand cannot slip into the vicinity of lever guide 59, in guide arm 60, because of rounded cam 58.

As noted above, quick-action stop valve 62 is opened by means of control lever 56 and is automatically closed once again when control lever 56 is released. For this purpose, quick-action stop valve 62 has seal seat 63, which is raised by means of piston 64. Piston 64 is moved by control lever 56 and guide pin 65. Control lever 56 is bolted on handle 4 in the longitudinal direction. An effective seal is created by gasket 66, whereby the gas can flow by means of overflow passages 52, parallel to piston 64, when quick action stop valve 62 is raised from seal seat 63. This action takes place against the force of spring 69.

On both sides of seal seat 63, quick-action stop valve 62 is streamlined, so that, downward, it is adjacent to rounded flow extension 67 on seal seat 63 and, upward, it is adjacent to flow cone 68 which runs at an acute angle. Oxygen inlet hole 70 expands to accommodate a filter, if desired.

In summary the invention includes a compact lance for the injection of oxygen during the combustion process, a collet chuck, by means of which the tuyere introduced into the handle is fixed, an axial gasket, which is in contact with the tuyere and is partly enclosed by the gasket sleeve and can be compressed between the collet chuck and a projection in the inner hole, and a sleeve which holds the end of the tuyere, whereby, in the handle, there is a quick-action stop valve which can be activated by means of a control lever and a gas and slag holdback valve, characterized by the fact that between the collet chuck 3 and the gasket sleeve 22, there is a bushing 14, which can move axially and be fixed radially in the inner hole 5 of the handle 4, so that it acts in a corresponding manner on the collet chuck.

The invention also includes a compact lance characterized by the fact that a bushing 14 which has a slot 16 and a handle 4 has a radial hole 17, with a locator screw 19 engaged in the slot.

The invention further provides a compact lance characterized by the fact that the bushing 14 is connected with the collet chuck 3, preferably by welding.

The invention additionally provides a compact lance characterized by the fact that the collet chuck 3 and the bushing 14 are designed as a single piece.

The invention moreover provides a compact lance characterized by the fact that the part of the handle 4 which holds the collet chuck 3 has an external thread 37 which corresponds to an internal thread 38 of a closer 2.

The invention further provides a compact lance characterized by the fact that the inside diameter of the bushing 14 is designed to coincide with that of subsequent gasket 23.

The invention furthermore provides a compact lance characterized by the fact that a sleeve 26 which holds the tuyere 34 has a shoulder 26 which is matched to the tuyere, while a sleeve portion 27 which projects further into an inner hole 5 is designed as a tappet for a subsequent pressure-loaded valve acting as a gas and slag holdback valve.

The invention also further provides a compact lance characterized by the fact that the shoulder 26 of the sleeve 25 is flexibly supported in the inner hole 5.

The invention also furthermore provides a compact lance characterized by the fact that on the outer wall of the sleeve portion 27, there is a coil spring 28 braced against a projection 29 in the inner hole 5.

The invention also additionally provides a compact lance characterized by the fact that a radial hole 17 for a locator screw 19 is located in the vicinity of a thicker portion of a housing 18 of the handle 4.

The invention further includes a compact lance characterized by the fact that a collet chuck 3, which is tapered on the exposed end, and interacts with rounded edges 7 of a sleeve 6, whereby the sleeve has a radial extension 8 with which the closer 2 is in contact with an interposed ball bearing 9.

The invention furthermore includes a compact lance characterized by the fact that a valve acting as a gas and a slag holdback valve 43 is a spring-loaded check valve 46 connected with the sleeve portion 27, which has a gas-permeable sinter metal disc 48 and a gas check valve 49 with a guide 50 which closes independently of a control lever 56.

The invention additionally includes a compact lance characterized by the fact that the control lever 56 which can pivot around an axis of rotation 55 located in the handle 4 is slightly bent toward the handle, and has a rounded cam 58 on the end facing a lever guide 59.

The invention moreover includes a compact lance characterized by the fact that a quick-action stop valve 62, which can be activate by the lever 56, is streamlined on both sides of swivel seat 63.

The invention as described hereinabove in the context of a preferred embodiment is not to be taken as limited to all of the provided details thereof, since modifications and variations thereof may be made without departing from the spirit and scope of the invention.

What is claimed is:

1. A compact lance comprising:
   a handle defining a longitudinal axis;
   a chuck positioned within said handle;
   a gasket positioned within said handle and axially aligned with said chuck along said longitudinal axis;
   said chuck being axially movable along said longitudinal axis and positioned for being placed in contact with said gasket;
   means for axially moving said chuck into compressive contact with said gasket; and
   means for limiting relative rotation between said chuck and said handle.

2. The compact lance of claim 1 wherein:
   said chuck is a collet having an external thread; and
   said means for axially moving said chuck is a closer having an internal thread corresponding to said external thread of said chuck.

3. The compact lance of claim 1 wherein said chuck is axially slotted.

4. The compact lance of claim 3 wherein means are provided for radially immobilizing a gas transportation means in said lance.

5. The compact lance of claim 4, wherein said immobilizing means is a locator, said locator being engaged with said gas transportation means through said chuck slot.

6. The compact lance of claim 5 wherein:
   the axial dimension of said chuck is greater than the dimension of said locator portion inserted therethrough;
   the radial dimension of said slot approximates that of said locator portion inserted therethrough; and
   said slot is characterized by restricting the radial movement of said chuck but permitting axial movement of said chuck vis a vis said locator.

7. The compact lance of claim 6 wherein said locator is a screw.

8. The compact lance of claim 6 wherein the inside diameters of said gasket and said chuck are substantially equal.

9. The compact lance of claim 8 wherein said gasket is enveloped in a gasket sleeve having a shoulder adapted to bear against said chuck when said gas-transportation means are radially immobilized in the lance.

10. The compact lance of claim 9, further including:
    pressure relief means;
    said pressure relief means comprising a sleeve portion projecting into said compact lance;
    said pressure relief means comprising a coil spring;
    said handle having a thicker portion and a thinner portion;
    said means for radially immobilizing a gas transportation means being disposed in said thicker portion;
    said radially immobilizing means comprising a screw;
    said collet being tapered; and
    said handle being tapered at one end thereof.

11. A chuck for a compact lance, the lance having a handle defining a longitudinal axis, the handle having an opening therein, the chuck being positioned within the handle opening, a gasket being positioned within the handle opening and axially aligned with the chuck along the longitudinal axis, and a device for axially moving the chuck toward the gasket, said chuck comprising:

means for grasping a gas supply tube positioned within the handle opening when said chuck is moved toward the gasket;

surface means for applying a compressive force to the gasket when said chuck is moved toward and into contact with th gasket; and means for limiting relative rotation between said chuck and the handle.

12. The chuck of claim 11, wherein:

said chuck defines an axial slot;

said means for limiting relative rotation comprises a screw and said axial slot; and a portion of said screw is positioned within said axial slot.

13. The chuck of claim 12, wherein:

the axial dimension of said axial slot is greater than the dimension of said screw portion positioned therein;

the radial dimension of said axial slot approximately the dimension of said screw portion positioned therein;

relative rotation between said chuck and the handle is limited; and relative axial movement between said chuck and the handle is permitted.

14. The chuck of claim 13, wherein the inside diameters of the gasket and said chuck are substantially equal.

15. The chuck of claim 14, wherein said chuck is a collet.

16. A chuck for a compact lance for a gas tube, the lance having a handle and a gas tube gasket, said chuck comprising:

a sleeve defining a longitudinal axis and an opening;

said sleeve having first and second opposed ends spaced apart along said longitudinal axis;

said first sleeve end defining exterior surface means, said exterior surface means having an increasing cross sectional dimension in a first direction along said longitudinal axis, said first direction being from said first sleeve end toward said second sleeve end;

said first sleeve end defining an interior surface for grasping a gas tube within said longitudinal opening when said interior surface is moved radially inwardly;

said second sleeve end defining a surface for applying a compressive axial force to the gas tube gasket;

means for limiting relative rotation between said sleeve and the handle; and said sleeve being configured to move in said first direction, said first sleeve end interior surface being configured to move radially inwardly for grasping a tube therein, and said second sleeve end being configured to move to apply a compressive force to the gasket, when a component of force in said first direction is applied to said first sleeve end exterior surface.

17. The chuck of claim 16, wherein:

said chuck defines an axial slot;

said means for limiting relative rotation comprises a screw and said axial slot; and a portion of said screw is positioned within said axial slot.

18. The chuck of claim 17, wherein:

the axial dimension of said axial slot is greater than dimension of said screw portion positioned therein;

the radial dimension of said axial slot approximately the dimension of said screw portion positioned therein;

relative rotation between said chuck and the handle is limited; and relative axial movement between said chuck and the handle is permitted.

19. The chuck of claim 18, wherein the inside diameters of the gasket and said chuck are substantially equal.

20. The chuck of claim 19, wherein said chuck is a collet.

* * * * *

UNITED STATES PATENT AND TRADEMARK OFFICE
CERTIFICATE OF CORRECTION

PATENT NO. : 5,106,061
DATED : April 21, 1992
INVENTOR(S) : Horst Marmann It is certified that error appears in the above-identified patent and that said Letters Patent is hereby corrected as shown below:

In column 5, line 49, after 'gasket', delete "24" and insert --23--.

In column 5, line 50, after 'gasket', delete "24" and insert --23--.

In column 7, line 62, after 'be', delete "activate" and insert --activated--.

Signed and Sealed this

Twenty-fourth Day of August, 1993

*Attest:*

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,106,061
DATED : April 21, 1992
INVENTOR(S) : Horst MARMANN

It is certified that error appears in the above-indentified patent and that said Letters Patent is hereby corrected as shown below:

On the title page, item [56], under the "FOREIGN PATENT DOCUMENTS" section, before '10/1964', delete "1979917" and insert --1939917--.

Signed and Sealed this

Twenty-fifth Day of February, 1997

Attest:

BRUCE LEHMAN

*Attesting Officer*           *Commissioner of Patents and Trademarks*